J. PETRELLO.
PULLEY.
APPLICATION FILED JUNE 3, 1911.
1,022,869.
Patented Apr. 9, 1912.
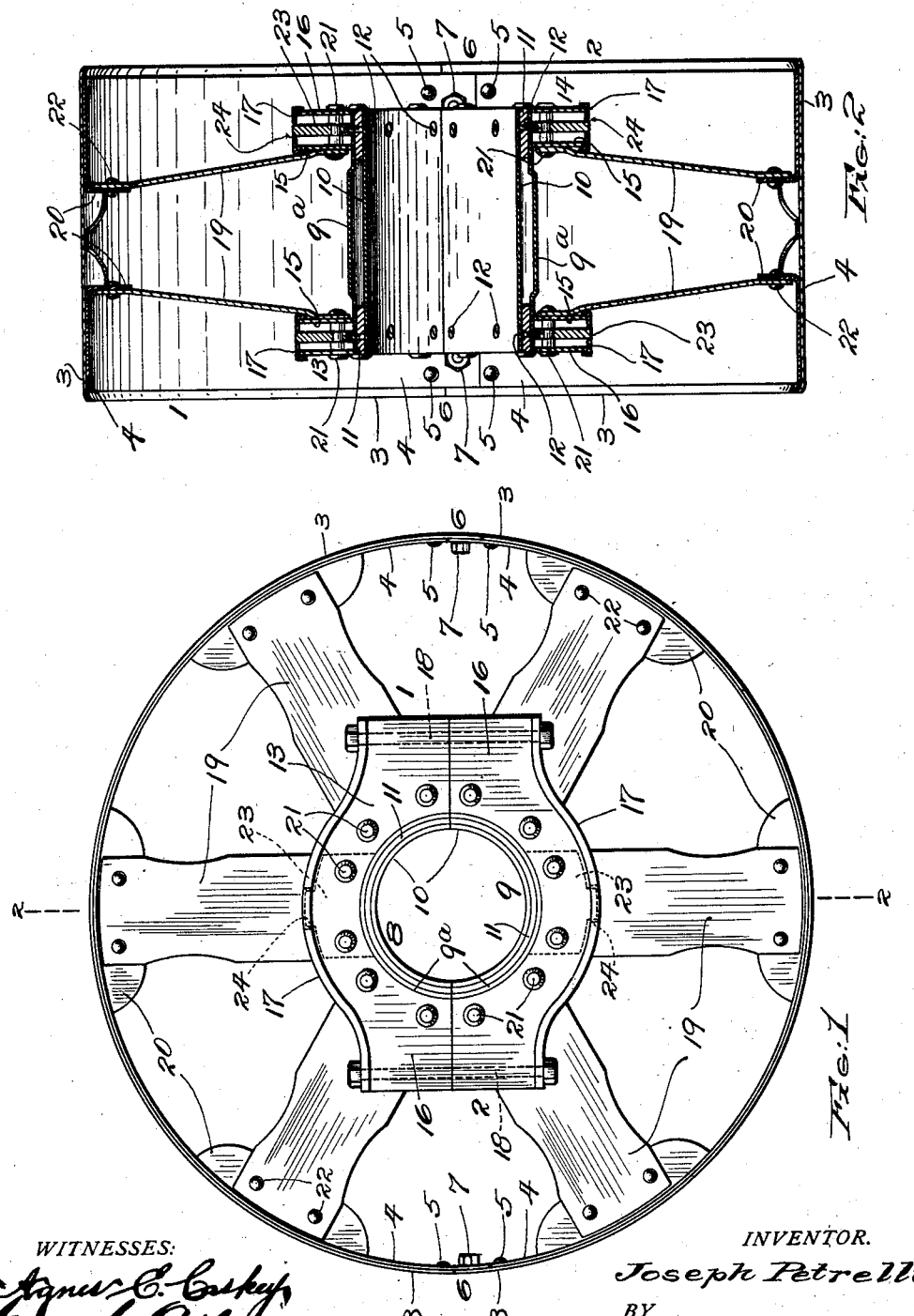
WITNESSES:
INVENTOR.
Joseph Petrello.
BY
ATTORNEY.

UNITED STATES PATENT OFFICE.

JOSEPH PETRELLO, OF PHILADELPHIA, PENNSYLVANIA.

PULLEY.

1,022,869. Specification of Letters Patent. Patented Apr. 9, 1912.

Application filed June 3, 1911. Serial No. 630,985.

*To all whom it may concern:*

Be it known that I, JOSEPH PETRELLO, a subject of the Czar of Russia, residing at Philadelphia, in the county of Philadelphia and State of Pennsylvania, have invented an Improvement in Pulleys, of which the following is a specification.

This invention relates broadly to pulleys and has more particular relation to split pulleys constructed of pressed sheet metal.

The principal object of the present invention is to provide a split pulley constructed of pressed sheet metal, adapted to have its two parts so clamped with respect to shafting that slipping of the pulley is obviated.

A further object of the present invention is to provide a split pulley of pressed sheet metal, which is light in weight, but possessed of great strength, and which may be manufactured at comparatively small cost.

Other and further objects of the invention relate to the providing of general details of construction and arrangement of parts as will hereinafter more fully appear.

The invention consists of the improvements hereinafter described and finally claimed.

The nature, characteristic features and scope of the invention will be more fully understood from the following description, taken in connection with the accompanying drawings, forming part hereof and in which:

Figure 1, is a view in side elevation of a pulley embodying the invention, and Fig. 2, is a view in section taken upon the line 2—2 of Fig. 1.

In the drawings, the split pulley is shown as comprising sections 1, and 2, the rims 3, and 4, of which are riveted together as at 5, and overlap one another as at 6, see Fig. 1. The overlapping portions 6, of the rims 3, and 4, are bolted together as at 7. As shown in Fig. 2, the inner rim 4, is slightly narrower than the outer rim 3. The split sections 8, and 9, forming the bearing of the pulley comprise spaced telescopically arranged members 9ª, and 10, suitably spaced by semi-circular pieces 11. Said spaced telescopically-arranged members 9ª, and 10, are held together by means of rivets 12, see Fig. 2. Upon each end of and carried by the bearing parts of the pulley are sections 13, and 14, forming in effect a clamp for clamping the pulley as a whole to shafting. As shown in Fig. 2, the clamp portion of the invention comprises spaced plates 15, and 16, secured together and provided top and bottom with removable channeled pieces 17, apertured for the passage therethrough of securing bolts 18. These bolts 18, pass through the channeled pieces 17, and through the sections 13, and 14, or in other words between the plates 15, and 16, thereof, for clamping the pulley as a whole to shafting. Connecting the sections 13, and 14, and the inner rim 4, of the pulley are radially-arranged plates in pairs 19, forming the spokes of the pulley.

In practice good results have been obtained by cutting from the inner rim 4, of the pulley, tongues 20, to form vertically-arranged inwardly extending projections. The spokes 19, of the pulley are riveted to the sections 13, and 14, by means of rivets 21, and are connected to the projections 20, by means of rivets 22. To assist in interlocking sections 1, and 2, of the pulley, use is made of keys 23, secured between the plates 15, and 16, of the sections 13 and 14, by the rivets 21. The channeled pieces 17, are apertured as at 24, to receive the keys 23, when said channeled pieces are fitted over the plates 15, and 16, of the sections 13, and 14. It will thus be apparent the when the sections 13, and 14, are interlocked as described by the bolts 18, channeled pieces 17, including keys 23, and the rims interlocked by means of the bolts 7, the sections 1, and 2, of the pulley are securely interlocked and the bearing portion of the pulley firmly clamped to proper shafting at the same time. It will be readily apparent that the sections 13, and 14, will be so clamped to the shafting that slipping thereon of the pulley will be obviated. Such a construction as above described is possessed of minimum lightness, maximum strength and being simple in structure, may be manufactured at comparatively little cost.

What I claim is:

1. In a split pulley constructed of pressed sheet metal, a tubular bearing, clamping sections fixed to each end of said bearing, fixed keys carried by the clamping sections, channeled pieces fitted over said clamping sections and coöperating with said keys, bolts for clamping together said channeled pieces including said clamping sections, overlapping rim parts bolted together and arms arranged in pairs connecting said clamping sections and the rim parts.

2. In a split pulley constructed of pressed sheet metal, a tubular and telescopically-arranged bearing, clamping sections comprising spaced plates fixed to each end of said bearing, fixed keys carried between each of said spaced plates, channeled pieces fitted over said spaced plates and coöperating with said keys, bolts for interlocking said clamping sections and channeled pieces, overlapping rim parts bolted together and arms arranged in pairs connecting together said clamping sections and said rim.

3. In a split pulley constructed of pressed sheet metal, a tubular bearing, clamping sections fixed to each end of said bearing, keys fixed to said clamping sections, channeled pieces coöperating with said keys and fitted over said clamping sections, bolts for clamping together said channeled pieces including said sections, telescopically-arranged rims for the pulley the inner rim of which is provided with inwardly-projecting tongues, arms arranged in pairs connecting said clamping sections and said tongues and means for clamping the rim parts together.

In testimony whereof, I have hereunto signed my name.

JOSEPH PETRELLO.

Witnesses:
 HARRY R. KATZ,
 AGNES E. CASKEY.

Copies of this patent may be obtained for five cents each, by addressing the "Commissioner of Patents, Washington, D. C."